Oct. 25, 1932.                L. W. LESSLER                1,883,998
                              CAMERA SHUTTER
                            Filed March 12, 1931
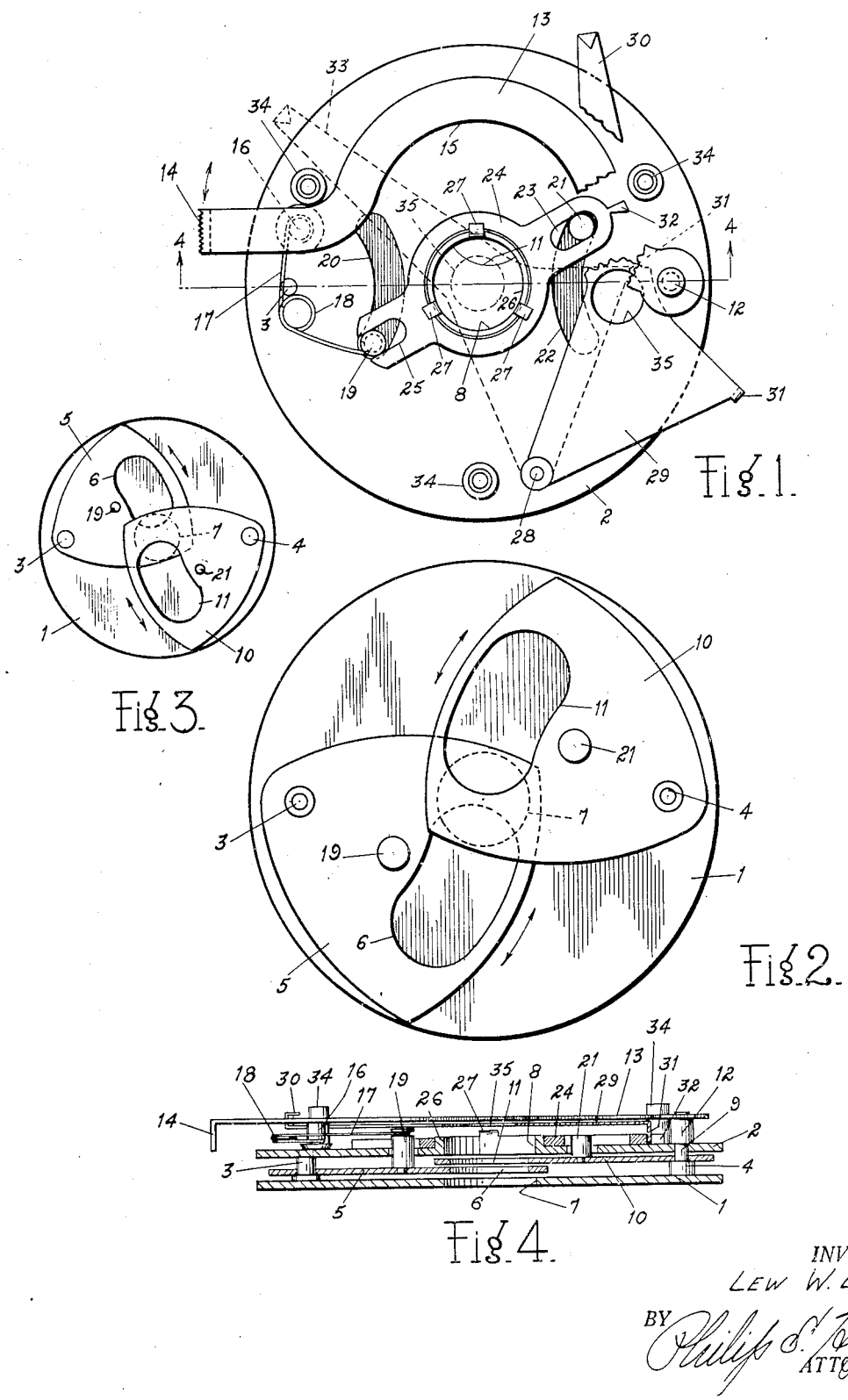
INVENTOR.
LEW W. LESSLER.
BY
        ATTORNEY.

Patented Oct. 25, 1932

1,883,998

UNITED STATES PATENT OFFICE

LEW W. LESSLER, OF JOHNSON CITY, NEW YORK, ASSIGNOR TO AGFA ANSCO CORPORATION, OF BINGHAMTON, NEW YORK, A CORPORATION OF NEW YORK

CAMERA SHUTTER

Application filed March 12, 1931. Serial No. 522,006.

My invention relates to improvements in camera shutters and has for its primary object the provision of an extremely simple, inexpensive and positively acting shutter for photographic cameras, made of few parts and easily assembled.

One feature and object of my invention is to provide a shutter having two cooperating leaves adapted to pass each other in operation and upon such passage to open and close the exposure aperture through which the picture is exposed.

Another feature and object lies in the provision of means whereby the operation of one leaf produces a simultaneous actuation of the other.

A further object of my invention lies in the provision of means for permitting time exposures with the shutter through the medium of a lever which when moved to time exposure position automatically reduces the size of the exposure aperture.

Another object of my invention lies in novel features of construction permitting an economy of parts which will be more fully described hereinafter.

A further and important object of my invention lies in the provision of an arrangement of the shutter leaves whereby the registering of slots in such leaves and the passage of the leaves past each other, causes the opening and closing of the exposure aperture.

Other objects and advantages in details of construction and arrangement of parts will be apparent as the description proceeds, reference now being had to the figures of the accompanying drawing forming a part of this application and wherein like reference numerals indicate like parts.

In the drawing:

Figure 1 is a top plan view of my shutter removed from its outer casing or housing.

Figure 2 is a top plan view of the shutter leaves, the upper cover plate and actuating mechanism being removed for clearness of illustration.

Figure 3 is a detail plan view similar to Figure 2 showing the shutter leaves in reversed position from that shown in Figure 2.

Figure 4 is a cross sectional view taken on the line 4—4 of Figure 1 but showing the operating parts of the shutter set for "time" exposure.

Referring now to the drawing, the reference character 1 indicates the lower base or supporting plate spaced above which is the upper or cover plate 2, held in spaced relation by means of the pins 3 and 4. Pivoted upon the pin 3 is a shutter leaf 5, provided adjacent its free end with an elongated slot or opening 6 so disposed that when the shutter leaf is moved on its pivot, the opening 6 will pass and register with the opening 7 in the bottom plate 1 and the opening 8 in the cover plate 2, forming the exposure aperture.

It will be noted with reference to Figure 4 that the pin 4 is reduced intermediate its ends as at 9, and pivoted to such reduced portion is a second shutter leaf 10, also provided adjacent its free end with an elongated opening or slot 11 so disposed that upon movement of the leaf 10 the opening 11 will pass and register with the openings 7 and 8 in the plates 1 and 2 and also with the opening 6 in the leaf 5.

Pivoted to the upper end 12 of the pin 4 above the cover plate 2, is one end of an actuating lever 13 provided at its free opposite end with a downwardly bent, knurled finger piece 14. This lever is bent centrally as at 15 so as not to interfere with the exposure aperture and other operating parts centrally disposed as hereinafter pointed out. Carried on the underside of this lever 13 adjacent its free end thereof, is a downwardly extending pin 16 to which is secured one end of a spring 17 coiled centrally of its length at 18 and having its opposite end secured to a pin 19 carried by the upper side of the shutter leaf 5. This pin 19 extends upwardly through an arcuate slot 20 in the cover plate 2.

Springs of this type are well known in shutter construction and the operation thereof is believed clear. If the lever 13 is moved downwardly in Figure 1 on its pivot, the spring 17 will become compressed and as the lever moves past the central point of compression of the spring, the tension will be released to throw the lever 5 from the position shown in Figure 2 to that shown in Figure 3, by virtue of the free coil 18 in the center of the spring. Likewise when the lever 13 is moved in the opposite direction to the position shown in Figure 1, the same action takes place and when the center of compression of the spring is passed, the tension extends itself to throw the shutter leaf 5 to the position shown in Figure 2. Such construction and operation is well known in the art and forms no part of this invention except in the combination hereafter described and claimed.

In order that the movements of the shutter leaf 5 may be communicated to the shutter leaf 10 in reverse direction, in order that the leaves may move together and past each other and to uncover the exposure aperture during such passage, connecting means are provided between the levers. The leaf 10 is provided with an upwardly extending pin 21 passing through an arcuate slot 22 in the cover plate 2 and into a slot 23 provided in one end of a link member 24, the opposite end of which is also slotted as at 25, the pin 19 on the shutter leaf 5 engaging in such slot 25.

The link 24 is pivoted upon the upper surface of the cover 2 by means of a circular flange 26 formed in the cover plate around the opening 8 therethrough. The flange 26 thus provides a bearing about which the link 24 is rotatable. Ears 27 may be turned outwardly over the link 24 whereby the same is retained and guided in its pivotal position.

From the foregoing it will be obvious that operation of the lever 13 to cause the movement of the shutter leaf 5 through the spring 17, will result in simultaneous movement in the reverse direction of the shutter leaf 10 by virtue of the connecting link 24.

It will be noted with reference particularly to Figures 2 and 3 that the slots 6 and 11 in the shutter leaves 5 and 10 respectively are so aligned that simultaneous movement of the shutter leaves in opposite directions will result in the slots 6 and 11 registering with each other and with the exposure aperture 7, thus admitting light therethrough. When the leaves are in their normal positions, however, that is either as shown in Figure 2 or Figure 3, the overlapping portions of the shutter leaves serve to close the exposure aperture completely.

The structure so far described explains the operation of the shutter for "snapshots" or "instantaneous" exposures where the length of the exposure is controlled merely by the time required by the spring 17 to shift the position of the shutter leaves. Means are also provided for permitting "time" exposures, that is, operating the leaves to register their openings with the exposure aperture and remain in such position until again actuated to return them to closed positions. This means will now be described.

Pivoted on the cover plate 2 as by means of the pin 28 is a lever 29 provided with an extending finger piece 30 and provided intermediate its ends with a downwardly extending lug 31. One end of the link 24 is provided with an extending stop lug 32. If it is desired to operate the shutter for "time" exposure, the lever 29 is pivoted to the left in Figure 1 to the position shown in dotted lines as at 33, the lever resting against one of the posts 34 which are provided for securing the mechanism within the casing or housing of the shutter. In such position, the downwardly turned lug 31 on the lever 29 is moved into the path of the stop lug 32 on the link 24. Consequently with the parts in such position, actuation of the lever 13 to shift the shutter leaves, results in stopping the movement of such leaves by means of the stop lug 32 engaging the lug 31. This position of stop is so arranged that when the stopping occurs the slots 6 and 11 in the shutter leaves will be uncovered and register with each other and with the exposure aperture. The parts, of course, remain in this position until the lever 13 is again actuated in the opposite direction whereupon the shutter leaves 5 and 10 are restored to their original position and the exposure aperture again closed.

It will be noted that the lever 29 is provided with an opening 35 of smaller diameter than the exposure apertures 7 and 8. It will also be noted that when the lever 29 is moved to the dotted line position shown in Figure 1, in other words to the "time" exposure position, this reduced aperture 35 is placed in alignment with the exposure apertures 7 and 8 whereby the effective exposure aperture at "time" exposure is considerably less than when the shutter is operated for "instantaneous" exposure. This is, of course, highly desirable as is well known in the photographic art and the change is thus brought about automatically for the operator and without the necessity of his remembering to change the effective exposure aperture when shifting from "instantaneous" to "time" exposure and vice versa.

It will thus be seen that I have provided a very simple shutter for photographic cameras inexpensive to manufacture and of very few operating parts, embodying novel features of shutter leaf arrangement and operation combined with the automatic change of effective exposure aperture with the settings for "time" and "instantaneous" exposures.

Of course, changes may be made in details of construction and operation without departing from the spirit and scope of my invention. I do not limit myself, therefore, to the exact form shown and described other than by the appended claims.

I claim:

1. A shutter for cameras comprising a pair of pivoted leaves provided with slots, a supporting plate having an exposure aperture, and means on said plate and swingable around said aperture for simultaneously moving said leaves in opposite directions, said slots being so disposed that upon such movement of said leaves past each other the slots register with said aperture.

2. A shutter for cameras comprising a pair of pivoted overlapping leaves provided with slots, a supporting plate having an exposure aperture, said leaves normally closing said aperture, and means for simultaneously moving said leaves in opposite directions whereby the slots in said leaves momentarily register with each other and with said aperture, said means comprising a lever actuated spring connected with one leaf and a link connected between said leaves, said link being rotatable around said aperture.

3. A shutter for camera comprising a pair of pivoted overlapping leaves provided with slots, a supporting plate having an exposure aperture, said leaves normally closing said aperture, and means for simultaneously moving said leaves in opposite directions whereby the slots in said leaves momentarily register with each other and with said aperture, said means comprising a lever actuated spring connected with one leaf and a link connection between said leaves, said supporting plate being flanged around said aperture and said link being rotatable around said flange.

4. A shutter for cameras comprising a pair of pivoted overlapping leaves provided with slots, a supporting plate having an exposure aperture, said leaves normally closing said aperture, means for simultaneously moving said leaves in opposite directions whereby the slots in said leaves momentarily register with each other and with said aperture, said means comprising a lever actuated spring connected with one leaf and a link connection between said leaves, said supporting plate being flanged around said aperture and said link being rotatable around said flange, and means for stopping said leaves in slot registering and exposure position, for "time" exposure.

5. A shutter for cameras comprising a pair of pivoted overlapping leaves provided with slots, a supporting plate having an exposure aperture, said leaves normally closing said aperture, means for simultaneously moving said leaves in opposite directions whereby the slots in said leaves momentarily register with each other and with said aperture, said means comprising a lever actuated spring connected with one leaf and a link connection between said leaves, said supporting plate being flanged around said aperture and said link being rotatable around said flange, and means for stopping said leaves in slot registering and exposure position, for "time" exposure, said means comprising a stop lug on said link and a second lever having a lug movable into the path of said stop lug.

6. A shutter for cameras comprising a pair of pivoted overlapping leaves provided with slots, a supporting plate having an exposure aperture, said leaves normally closing said aperture, means for simultaneously moving said leaves in opposite directions whereby the slots in said leaves momentarily register with each other and with said aperture, said means comprising a lever actuated spring connected with one leaf and a link connection between said leaves, said supporting plate being flanged around said aperture and said link being rotatable around said flange, and means for stopping said leaves in slot registering and exposure position, for "time" exposure, said means comprising a stop lug on said link and a second lever having a lug movable into the path of said stop lug, said second lever having a reduced exposure aperture which registers with said first aperture upon movement of the lever to "time" exposure position.

In testimony whereof, I affix my signature.

LEW W. LESSLER.